United States Patent [19] [11] Patent Number: 4,993,748
Jambor et al. [45] Date of Patent: Feb. 19, 1991

[54] DEVICE FOR THE VERTICALLY DISPLACEABLE RECEPTION OF THE UPPER BELT ARTICULATION OR BELT DEFLECTION POINT

[75] Inventors: Arno Jambor, Vaihingen/Enz; Erich Glauner, Böbliengen; Karl-Heinz Nägele, Gärtringen; Wolfgang Fussnegger, Horb; Werner Heiss, Sindelfingen, all of Fed. Rep. of Germany

[73] Assignee: Daimler-Benz AG, Fed. Rep. of Germany

[21] Appl. No.: 496,922

[22] Filed: Mar. 21, 1990

[30] Foreign Application Priority Data

Mar. 22, 1989 [DE] Fed. Rep. of Germany ....... 3909360

[51] Int. Cl.$^5$ ............................................. B60R 22/02
[52] U.S. Cl. ..................................... 280/808; 297/481
[58] Field of Search .............. 280/802, 804, 801, 808; 297/468, 469, 481, 483

[56] References Cited

U.S. PATENT DOCUMENTS 4,741,557  5/1988  Jambor et al. ..................... 280/808
4,775,167  10/1988  Schiller et al. ..................... 280/808

FOREIGN PATENT DOCUMENTS 2738140  3/1979  Fed. Rep. of Germany .
3302356  7/1984  Fed. Rep. of Germany .
59-179435  10/1984  Japan ................................. 280/801

Primary Examiner—Charles A. Marmor
Assistant Examiner—Karin Tyson
Attorney, Agent, or Firm—Evenson, Wands, Edwards, Lenahan & McKeown

[57] ABSTRACT

A device for the vertically displacable positioning of an upper belt articulation or belt deflection point in a two-door motor vehicle without a middle column includes a carrier which at its top end receives a belt articulation or belt deflection fitting. The carrier can be transferred from a position of rest concealed in a side wall to at least one upper position of use projecting beyond the side-wall trim. In order to obtain the best possible belt-band run of an oblique shoulder-belt portion, an advancing movement towards the center of the vehicle is impart to the carrier when it has reached its position of use, so that the belt articulation or belt deflection fitting moves a predetermined amount towards an associated seated occupant.

6 Claims, 3 Drawing Sheets

DEVICE FOR THE VERTICALLY DISPLACEABLE RECEPTION OF THE UPPER BELT ARTICULATION OR BELT DEFLECTION POINT

BACKGROUND AND SUMMARY OF THE INVENTION

The present invention relates to a device for a vertically displaceable positioning of an upper belt articulation or belt deflection point in a two-door motor vehicle without a middle column, including a carrier which at a top thereof receives a belt articulation or belt deflection fitting and which can be transferred from a position of rest covered by an interior side-wall trim to at least one upper position of use projecting beyond the side-wall trim.

A carrier for a safety belt of the type generally noted above, which, in its retracted concealed position of rest, does not adversely affect the appearance of the motor vehicle and the extension height of which can be matched to different shoulder heights, is disclosed by German Patent Specification No. 2,738,140. If the front seats are moved a substantial distance backwards, and furthermore, the associated backrest is also brought into a position inclined backwards, in the event of a collision, the safety belt may lose its restraining function, especially where slim occupants are concerned, because the shoulder-belt portion then runs more in the transverse direction of the vehicle than in its longitudinal direction. Even more unfavorable conditions arise when the interior is of generous size and there is, therefore, a greater distance between the upper belt articulation or belt deflection point and the shoulder of the belt user.

To remedy this, it would be appropriate either to shift the belt articulation or belt deflection point to the rear or bring this point nearer to the occupant. A shift to the rear is unsuitable because the space available to the passengers sitting at the back is then reduced. Further, when a belt-reeling mechanism is used, this mechanism and the delivered belt band are located in a region already largely filled by the adjusting mechanism for the associated side window. Bringing the belt articulation or belt deflection point towards the occupant considerably impairs access to the back seats and makes it difficult to leave these back seats easily.

Thus, an object of the present invention is, while still arranging a upper belt articulation or belt deflection point near a point of entry so as to ensure favorable conditions of space, to obtain, at all times, a shoulder-belt band run which is considered as the best possible, in all seat positions and even with a generously dimensioned distance between the shoulder and the belt articulation or belt deflection point, without making it difficult to get into and leave the back seats.

In an exemplary embodiment of the invention, a transverse displacement of the deflection point is obtained because the carrier, pivotable about a lower bearing, possesses a guide track on at least one of its outer surfaces aligned in the transverse direction of the vehicle. The guide track is engaged by a guide pin or fixed location so that when the carrier reaches a position of use, the guide pin runs into a track portion extending parallel to and spaced from the straight line direction of the guide track to tilt the carrier towards the seated passenger.

The parallel and spaced track portion can merge into an end portion which extends as a prolongation of the straight line direction of the guide track and which is passed through during the belt-feed function of the carrier.

Another carrier guidance arrangement can be obtained if the guide track extends continuously beyond the spaced track portion extending parallel to it. In this carrier guidance arrangement, the carrier is moved until it reaches an offering position for the belt band and the lock tongue, at which point, the guide pin, running past tongues positioned in the guide track and pivotable counter to spring force, runs along the guide track as far as its lower end in a straight line. Only during the return of the carrier is the guide pin transferred into the spaced and parallel track portion by an inclined lower tongue in the guide track for the assumption of the position of use.

In another exemplary embodiment of the invention, the carrier has a pivot part pivotable about a lower bearing and supported on the body and a telescopic part extendable from this pivot part and receiving the belt deflection point. The pivot part is supported via a lever arrangement, of which the end located at the body, in the position of use of the carrier, is movable upwards with slot guidance so as to pivot the carrier away.

Other objects, advantages and novel features of the present invention will become apparent from the following detailed description of the invention when considered in conjunction with the accompanying drawings.

DETAILED DESCRIPTION OF THE DRAWINGS

Various exemplary embodiments of the invention are explained in detail below with particular reference to the application drawings.

Figure 1:
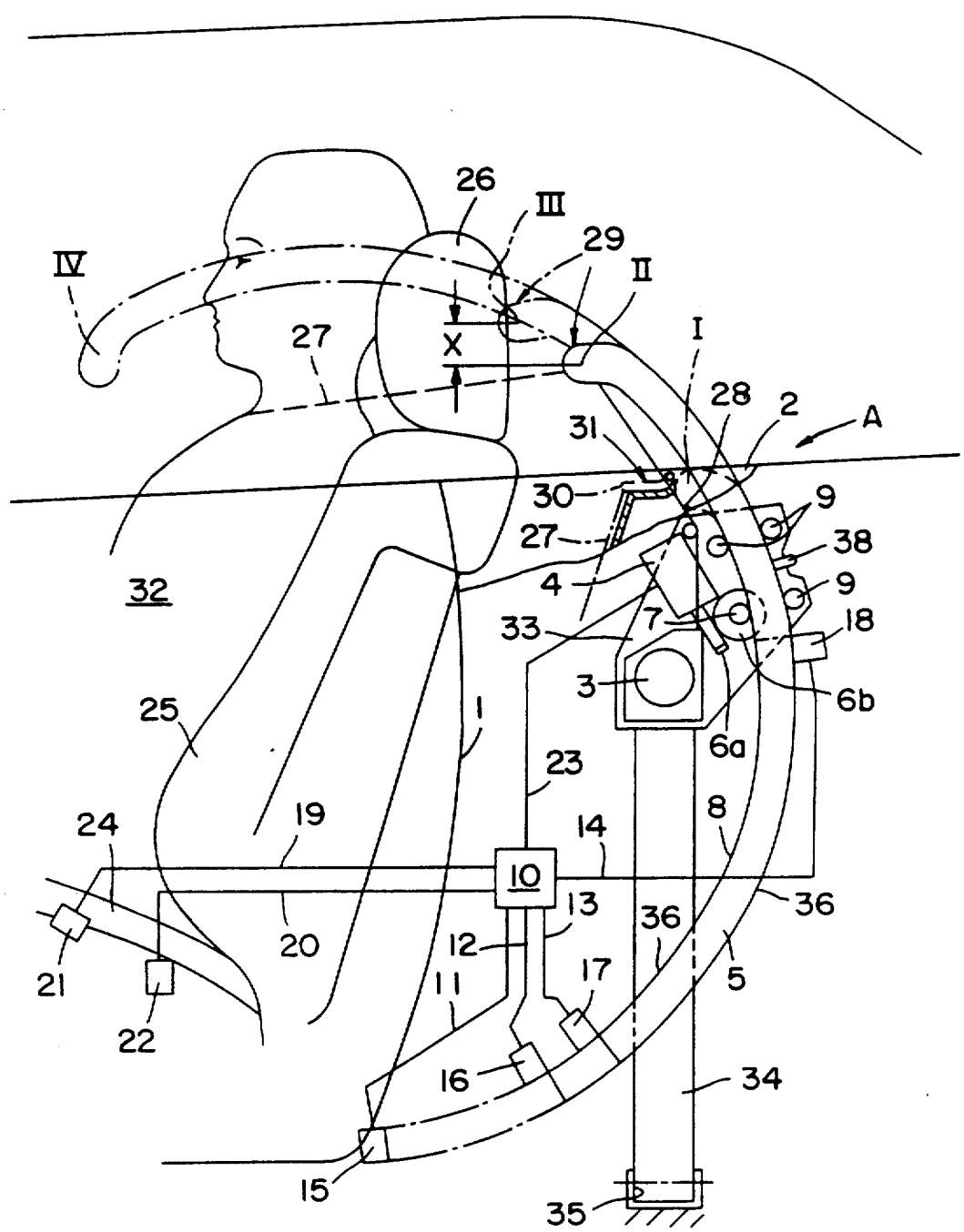
FIG. 1 shows a first pivotably received carrier which can be used as a belt feeder.

According to FIG. 1, in a two-door passenger car (not shown in detail) constructed without a middle column, a side-wall trim 2 adjoins the door cutout 1 which is offset in a stepped manner, only an upper region of the trim 2 being shown in FIG. 1. The side-wall trim 2 covers a belt-reeling mechanism 3 of a three-point safety-belt system (not shown further) as seen from the perspective of the passenger space. A carrier 5 extendable and retractable by a servo-drive 4 is also covered from view by the side-wall trim 2, the carrier 5 having an arcuate shape curved uniformly in the direction travel.

The servo-drive 4 is equipped with a self-locking gear stage including a worm 6a and a worm wheel 6b, and a pinion 7 which is arranged coaxially relative to the worm wheel 6b and meshes with a rack portion 8 mounted on an associated narrow side of the carrier 5. Next to the pinion 8 are also arranged three guide bodies 9 bearing on mutually opposite narrow sides of the carrier 5 for the guidance of the carrier 5.

A centrally located control unit 10 has inputs 11 to 14 for respectively receiving input signals from limit switches 15 to 18 interacting with the carrier 5. The central unit 10 has further inputs 19 and 20 for receiving signals generated by a seat contact switch 21 and a belt-lock switch 22 as well as an output 23 for controlling the servo-drive 4. The belt-lock switch 22 is assigned to a seat, generally indicated at A, of which the seat cushion 24, backrest 25 and headrest 26 are merely indicated.

A belt band 27 of a three-point safety-belt system (not shown in detail) leads from the belt-reeling mechanism 3 to deflection point 28 and from there to a belt deflection fitting 29 (not shown in detail) which is arranged at an upper free end of the carrier 5. In a retracted state of the carrier 5, in which the latter has just disappeared behind the side-wall trim 2, a lock tongue 30 of the belt band 27 is designed to bear on a step-shaped offset 31 of the side-wall trim 2 at which point the belt band 27 runs from this position to a lower belt fastening point (not shown) located at the door.

When an occupant, after opening the associated door 32, takes his place on the seat cushion 24, the seat-contact switch 21 is closed and the control unit 10 is activated by the input 19. Preferably with a time delay or even only after the closing of the door 32, the servo-drive 4 is connected with the supply system under control by the output 23. The rotational movement of the servo-drive 4, transmitted to the rotating pinion 7, transfers the carrier 5 from a position of rest limited by the limit switch 15 (shown in solid times in FIG. 1) to the offering position (represented by dot-and-dash lines in FIG. 1). During this cycle of movement, the limit switches 16 and 17 are overridden, without their functioning being triggered, and only when the limit switch 18 responds is the servo-drive 4 cut off. In this offering position, the lock tongue 30 can easily be grasped and introduced into the belt lock (not shown). Once the tongue 30 is latched the belt-lock switch 22 is closed.

The carrier 5 is now moved back by the pinion 7 of the servo-drive 4, which is activated to run in an opposite direction, until the limit switch 17 responds due to activation by the carrier 5. The carrier 5 and with it the belt deflection fitting 29 now assume an upper position of use (represented by unbroken line in FIG. 1) in which a belt-band run in the area of the neck region, appropriate for a tall person, i.e., a so-called "seated giant", is obtained. Starting from this height position, the upper belt deflection point 28 can be adjustably lowered continuously as far as an indicated amount "x" as a result of a manually actuated cut-in of the servo-drive 4. As a result, the upper belt deflection point 28 can be adjusted to obtain a safe belt-band run for shorter occupants including so-called "seated dwarfs". This lower position of use is limited by the limit switch 16.

Of course, it would also be possible, starting from the offering position, to assume the lower position of use in one movement and then, if required, select a higher position of use. A further possibility for setting a body-related position of use is, for example, to sense the shoulder height of the seat user or obtain a signal from the height of the headrest 26 which is entered in the control unit 10, whereupon the servo-drive 4 is activated until the particular ideal position of us is obtained.

When the lock tongue 30 is released so that the occupant can get out of the motor vehicle seat A, the belt-lock switch 22 responds and, after the seat is vacated, the seat-contact switch 21 is also opened. As a result, the servo-drive 4 is activated and driven in a direction of rotation that, by means of the pinion 7 and its meshing with the rack portion 8, the carrier 5 is lowered into its position of rest which is limited by the limit switch 15.

If, in the offering position, the occupant forgets to remove the lock tongue 30 or deliberately neglects this, it is necessary to ensure that, after a predetermined period of time has elapsed and at the latest when the trip commences, the carrier 5 is automatically transferred into at least a position of use.

The above-described exemplary embodiment provides a shoulder-belt band run conforming sufficiently well to requirements when the seat cushion 24 and the backrest 25 are not shifted too far backwards and the distance between the shoulder of the belt user and the belt deflection fitting 29 is not too great. In order to control even these influencing variables, the belt-reeling mechanism 3, the servo-drive 4 and the guide bodies 9 are combined on a baseplate 33 and this is fastened to an arm 34. The arm 34 is secured to the vehicle body via a lower bearing 35, so that the carrier 5 is pivotable in the transverse direction of the vehicle by measures described in detailed below.

Figure 2:
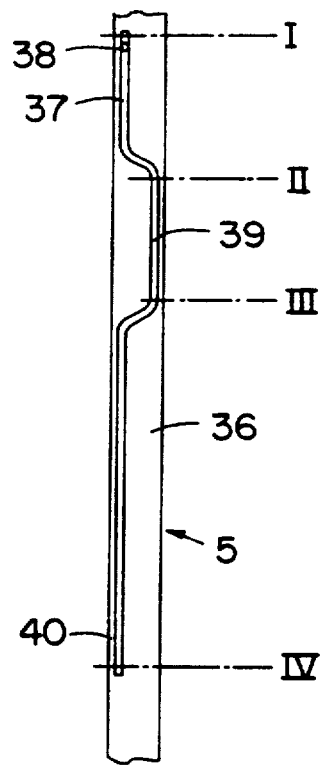
FIG. 2 shows a view of the carrier, as seen in the direction of the arrow "A", with a first track design.
Figure 3:
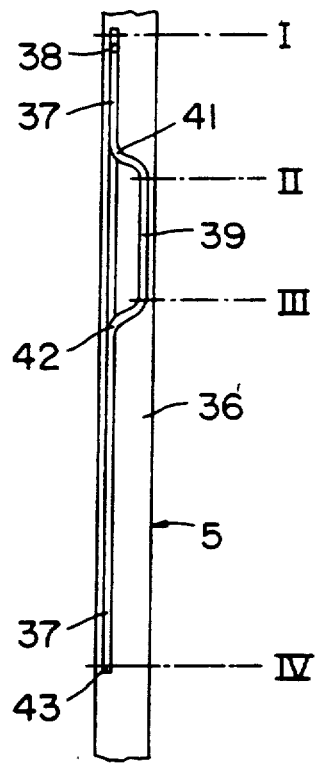
FIG. 3 shows a view according to the FIG. 2 with another track design.
Figure 4:
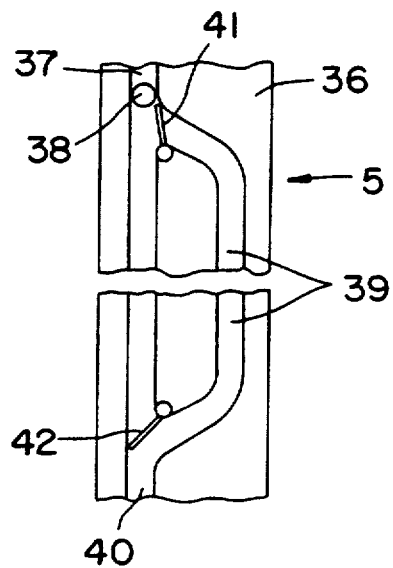
FIG. 4 shows, on a larger scale, the transitional region between the continuous track and the track portion according to FIG. 3 extending parallel to it.

As can be taken from FIGS. 2 to 4, on an outer surface 36 of the carrier 5 facing away from the belt-reeling mechanism 3, there is provided a guide track 37, into which a guide pin 38, fastened to the vehicle body, engages. According to FIG. 2, starting from the lower position of rest for the guide pin 38, designated at I, and also shown in FIG. 1, the guide track 37 merges into a track portion 39 extending parallel to the direction of the guide track 37 when a lower position of use denoted at II is reached. After passing through an upper position of use indicated at III, the track portion 39 is followed by an end portion 40 which extends as a prolongation of the guide track 37 and which the guide pin 38 run through in order to reach the offering position designated at IV.

When the guide pin 38, starting from the position of rest I or the offering position IV, is transferred into the track portion 39, the carrier 5 pivots a predetermined amount towards the associated seated occupant, with the result that the belt deflection fitting 29 (FIG. 1) is also transferred beyond the region of the position of use into a position providing the best possible belt guidance for the shoulder-belt portion of the belt band 27. So that as large a pivoting amount as possible can be obtained, the side-wall trim 2, indicated in FIG. 1, is divided in a vertical direction at the region of the emerging carrier 5 in a way not shown and is connected, for example, to the arm 34, so that the danger of jamming when it pivots inwards is countered by inwardly directed trim portions likewise not shown.

If the temporary outward pivoting of the carrier 5 for the assumption of the belt-offering position is felt to cause disturbance, a track form, as shown in FIGS. 2 and 3, can be chosen. With this, the guide track 37 runs in a straight line from the position of rest I into the offering position IV. Resiliently deflecting tongues 41 and 42, shown larger in FIG. 4, ensure that the guide pin 38 remains in straight line guide track 37 and runs through the straight portion as far as its lower end 43.

Only during the return of the guide pin 38 from the offering position IV is the tongue 42 moved resiliently away during the forward run, the tongue 42 being activated with the effect of a guide surface to direct the guide pin 38 into the track portion 39. During the transfer of the carrier 5 out of the positions of use III and II into the position of rest I, the guide pin 38, when it leaves the track portion 39, moves the tongue 41 temporarily sideways and runs into the guide track 37.

Figure 5:
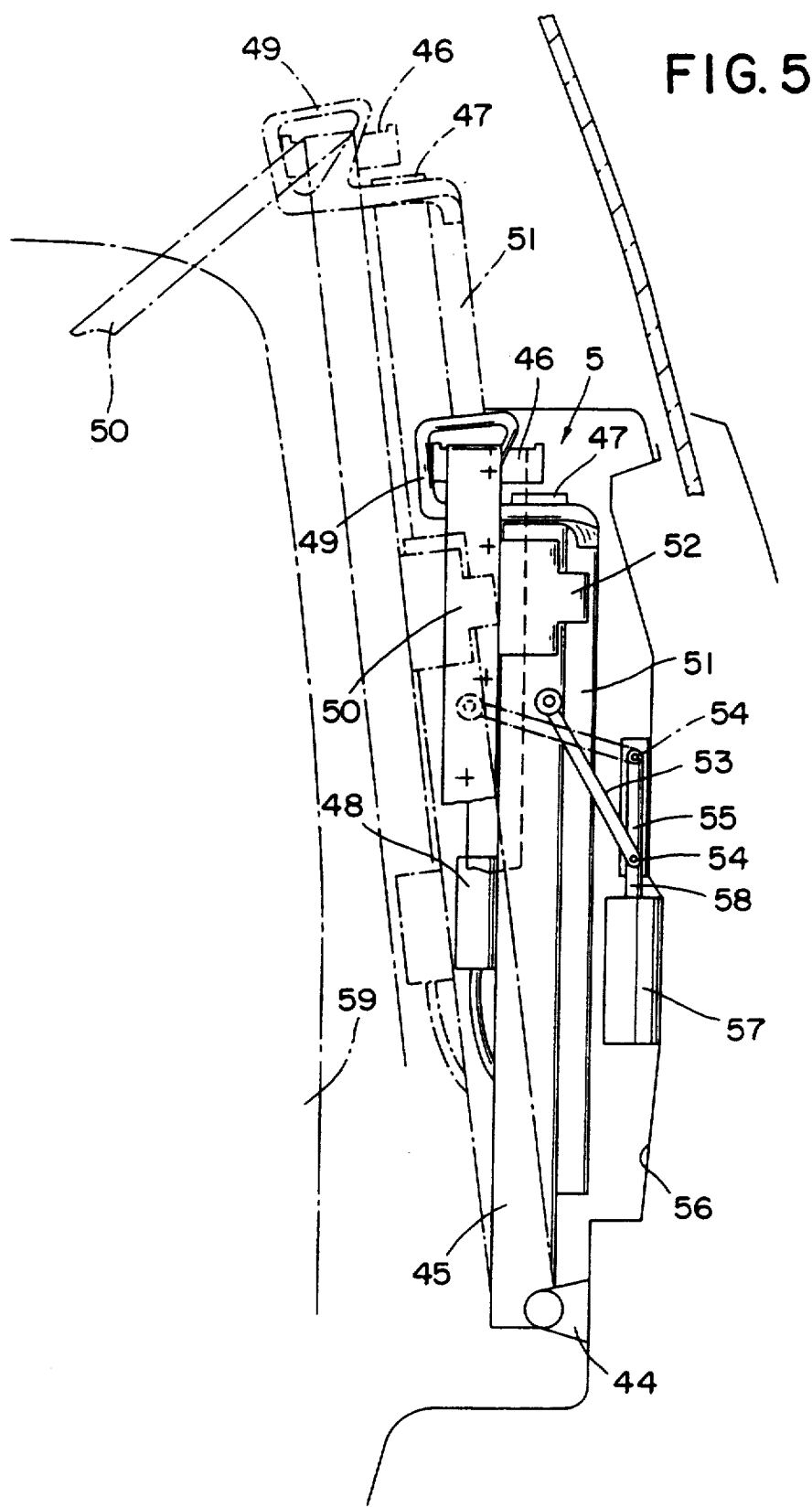
FIG. 5 shows a further pivotably received carrier which can be pivoted outwards via a lever arrangement and which is assigned a belt feeder.

The carrier 5 according to FIG. 5, represented by unbroken lines in its position of rest and by dot-and-dash lines in a position of use, comprises a pivot part 45 pivotable about a lower bearing 44 fixed to the vehicle and a telescopic part 47 extendable from the pivot part 45 and receiving the belt deflection point 46. The retracting and extending movement of the telescopic part 47 is brought about by a drive 48 (not shown in detail). Assigned to the carrier 5 is a belt feeder 51 which at the top has a passage lug 49 for the belt band 50 and which can be transferred temporarily into an offering position by adjusting means 52 merely indicated.

The pivot part 45 is supported on a body wall 56 via a lever arrangement 53 which includes as least one pair of levers having an end 54 located at the body which is received by a slot 55. There engages on that end 54 of the lever arrangement 53 located at the body, an adjusting rod 58 which is actable by a servo-motor 57 and which pivots the pivot part 45 outwards during an upward stroke, so that, in the position of use represented by dot-and-dash lines, the belt deflection point 46 is advantageously located opposite and closely adjacent to an occupant, not shown, supported against the backrest 59 of the associated seat.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A device for a vertically displacable positioning of an upper belt articulation or belt deflection point for a safety belt system which restrains a seated occupant in a two-door motor vehicle without a middle column comprising:
    a carrier having upper and lower ends and a belt articulation or belt deflection fitting positioned at the upper end thereof;
    carrier transfer means for transferring the carrier between a rest position and at least one upper position of use;
    an arm coupled at one end to the transfer means;
    a pivot bearing permitting the arm to pivot at the lower end thereof;
    a guide track provided at least one outer surface of the carrier aligned in a transverse direction of the vehicle, the guide track having a substantially straight guide track portion and a spaced and parallel guide track portion which is spaced from and in parallel with the substantially straight guide track portion; and
    a guide pin which engages the guide track and is positioned at a fixed location so that the belt articulation or belt deflection fitting of the carrier is moved a predetermined amount towards a center of the vehicle and the seated occupant during transfer of the carrier from the rest position to the at least one upper position of use.

2. A device according to claim 1, further comprising an interior side-wall trim for covering the carrier at the position of rest.

3. A device according to claim 1, wherein the spaced and parallel guide track portion is spaced from the substantially straight guide track portion towards the center of the vehicle.

4. A device according to claim 1, wherein the spaced and parallel track portion merges into an end portion of the guide track which extends as a prolongation of the substantially straight guide track portion and which is engaged by the guide pin during transfer of the carrier to the at least one upper position of use.

5. A device according to claim 1, wherein the guide track extends continuously beyond the spaced and parallel track portion and includes a tongue positioned at each juncture between the spaced and parallel track portion and the substantially straight guide track portion, wherein, when the carrier is transferred to an offering position for a belt band and a lock tongue of the safety belt system, the guide pin runs past each of the tongues pivotable counter to the spring force and along the guide track as far as its lower end in a straight line, and wherein, only during a return of the carrier is the guide pin transferred into the spaced and parallel track portion by an inclined lower tongue for the assumption of the position of use.

6. A device for a vertically displacable positioning of an upper belt articulation or belt deflection point for a safety belt system which restrains a seated occupant in a two-door motor vehicle without a middle column comprising:
    a carrier having a pivot part and a telescopic part extendable from the pivot part, the telescopic part having a belt deflection point positioned at an upper end thereof;
    telescopic part transfer means for transferring the telescopic part of the carrier between a rest position and at least one upper position of use;
    a pivot bearing attached to the vehicle body and about which the pivot part of the carrier pivots;
    a lever arrangement for supporting the pivot part and having one end attached to the pivot part of the carrier and an other end located at the vehicle body;
    lever drive means for moving the lever arrangement between extended and retracted positions; and
    guide track means for receiving the end of the lever arrangement located at the vehicle body so that the pivot part of the carrier is pivoted towards a center of the vehicle and the seated occupant as the lever arrangement is moved to the extended position by the lever drive means during transfer of the telescopic part of the carrier to the at least one upper position of use.

* * * * *